United States Patent
Rane (10) Patent No.: US 9,210,008 B2
(45) Date of Patent: Dec. 8, 2015

(54) SERDES COMMUNICATIONS WITH RETIMING RECEIVER SUPPORTING LINK TRAINING

(71) Applicant: Texas Instruments Incorporated, Dallas, TX (US)

(72) Inventor: Amit S. Rane, Santa Clara, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/454,420

(22) Filed: Aug. 7, 2014

(65) Prior Publication Data

US 2015/0043628 A1    Feb. 12, 2015

Related U.S. Application Data

(60) Provisional application No. 61/863,293, filed on Aug. 7, 2013.

(51) Int. Cl.

| | |
|---|---|
| *H03H 7/30* | (2006.01) |
| *H03H 7/40* | (2006.01) |
| *H03K 5/159* | (2006.01) |
| *H04L 25/03* | (2006.01) |
| *H04L 7/00* | (2006.01) |
| *H04L 7/10* | (2006.01) |

(52) U.S. Cl.

CPC ........ *H04L 25/03019* (2013.01); *H04L 7/0087* (2013.01); *H04L 7/10* (2013.01); *H04L 25/03261* (2013.01); *H04L 25/03878* (2013.01)

(58) Field of Classification Search

CPC ................. H01L 2924/00; H01L 2224/73204; H01L 2224/16225

See application file for complete search history.

(56) References Cited

U.S. PATENT DOCUMENTS

2014/0273852 A1* 9/2014 McCormack et al. ....... 455/41.2

* cited by examiner

*Primary Examiner* — Shuwang Liu
*Assistant Examiner* — Gina McKie
(74) *Attorney, Agent, or Firm* — Andrew Viger; Frank D. Cimino (57) ABSTRACT

A SerDes corn link with a retiming receiver is operable in link training (LT) mode. A SerDes transmitter includes a TX FIR channel driver to transmit TX Data with TX pre-emphasis EQ based on TX FIR coefficients. The retiming receiver includes an RTE (retimer/reclocker) with an RT FIR driver outputting retimed RX Data based on RT FIR coefficients. A link training unit (LTU) adjusts RT FIR coefficients based on a comparison of impulse cursor information for RX Data signals received at the RTE input and re-timed RX Data signals output from the RT FIR, so that the adjusted RT FIR coefficients correspond to the TX FIR coefficients (including reflecting LT changes in TX pre-emphasis EQ). In effect, the LTU performs a linear FIR coefficient translation from the TX FIR to the RT FIR, propagating LT FIR coefficient changes from RTE input to output.

20 Claims, 7 Drawing Sheets

SERDES COMMUNICATIONS WITH RETIMING RECEIVER SUPPORTING LINK TRAINING

CROSS-REFERENCE TO RELATED APPLICATIONS

Priority is hereby claimed under USC§119(e) to U.S. Provisional Application 61/863,293, filed 7 Aug. 2013.

BACKGROUND

1. Technical Field

This Patent Document relates to SERDES (serializer/deserializer) communications in which the receiver operates with data re-timing/reclocking.

2. Related Art

SerDes communications links experience high frequency distortion (phase and amplitude) between the XMTR (transmitter) and RCVR (receiver) over a lossy channel. This distortion is manifested at the RCVR as intersymbol interference (ISI), i.e., a smearing of the transmitted data bits/symbols.

Channel equalization (EQ) can be used to counteract ISI distortion. Transmit (TX) pre-emphasis EQ pre-distorts the transmit signal, pre-emphasizing the high frequency leading edge bit transitions to reduce ISI effects at the RCVR. TX pre-emphasis EQ can be combined with receiver equalization such as CTLE (continuous time linear equalizer).

Figure 1:
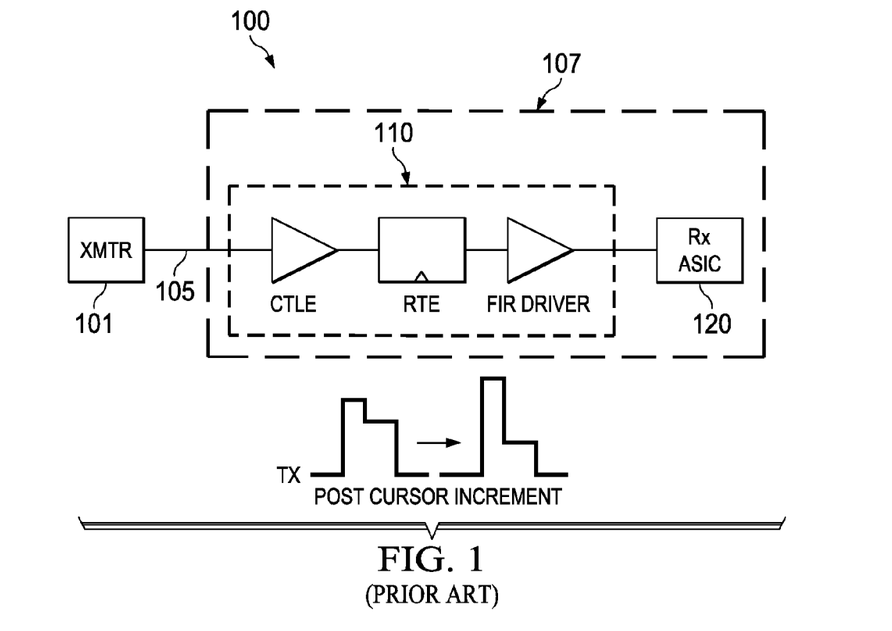
FIG. 1 illustrates a SerDes corn link in which the RCVR includes a Retimer.

FIG. 1 illustrates a SerDes com link 100 with a XMTR 101 and a RCVR 107, configured for SerDes communication over a com channel 105. XMTR 101 generates serialized data, including providing TX pre-emphasis. Signal pre-emphasis can be implemented with a FIR (finite impulse response) channel driver in which pre-emphasis EQ is determined by FIR coefficients.

RCVR 107 is illustrated as a retiming receiver that includes in the RX Path a re-timing element 110 that re-times/re-clocks received data for input to an RX ASIC 120. Re-timing elements (such as retimers or reclockers) modify data edge timing based on a recovered or locally generated bit clock, and can be implemented with FIR signal output based on loadable FIR coefficients.

Figure 2A:
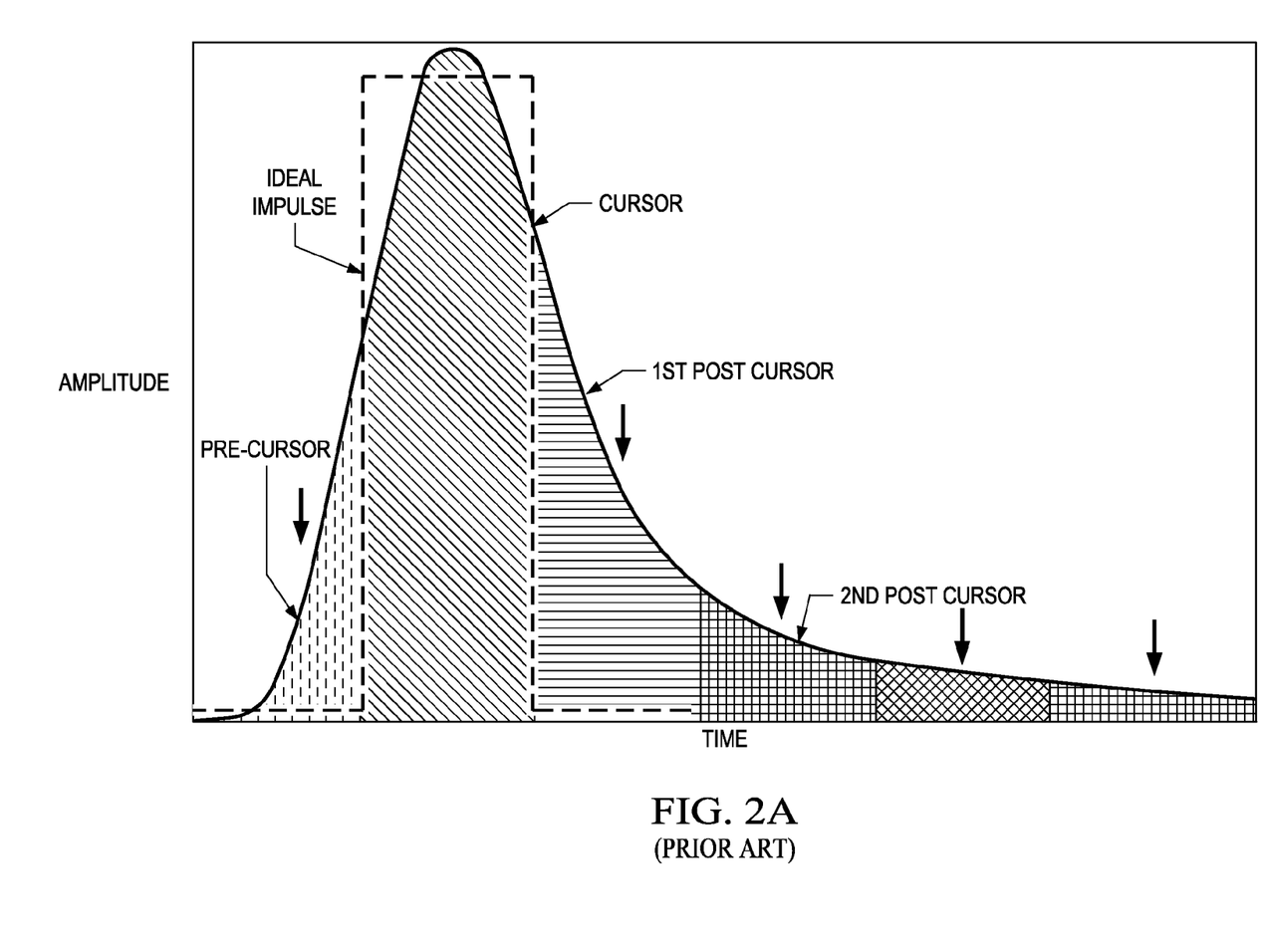
FIGS. 2A/2B illustrate ISI (intersymbol interference) in terms of symbol impulse response, including: (2A) main cursor, with pre- and post-cursor ISI energy distribution; and (2B) the effect on ISI profile of pre- and post-cursor adjustments, such as enabled by pre-emphasis EQ.
Figure 2B:
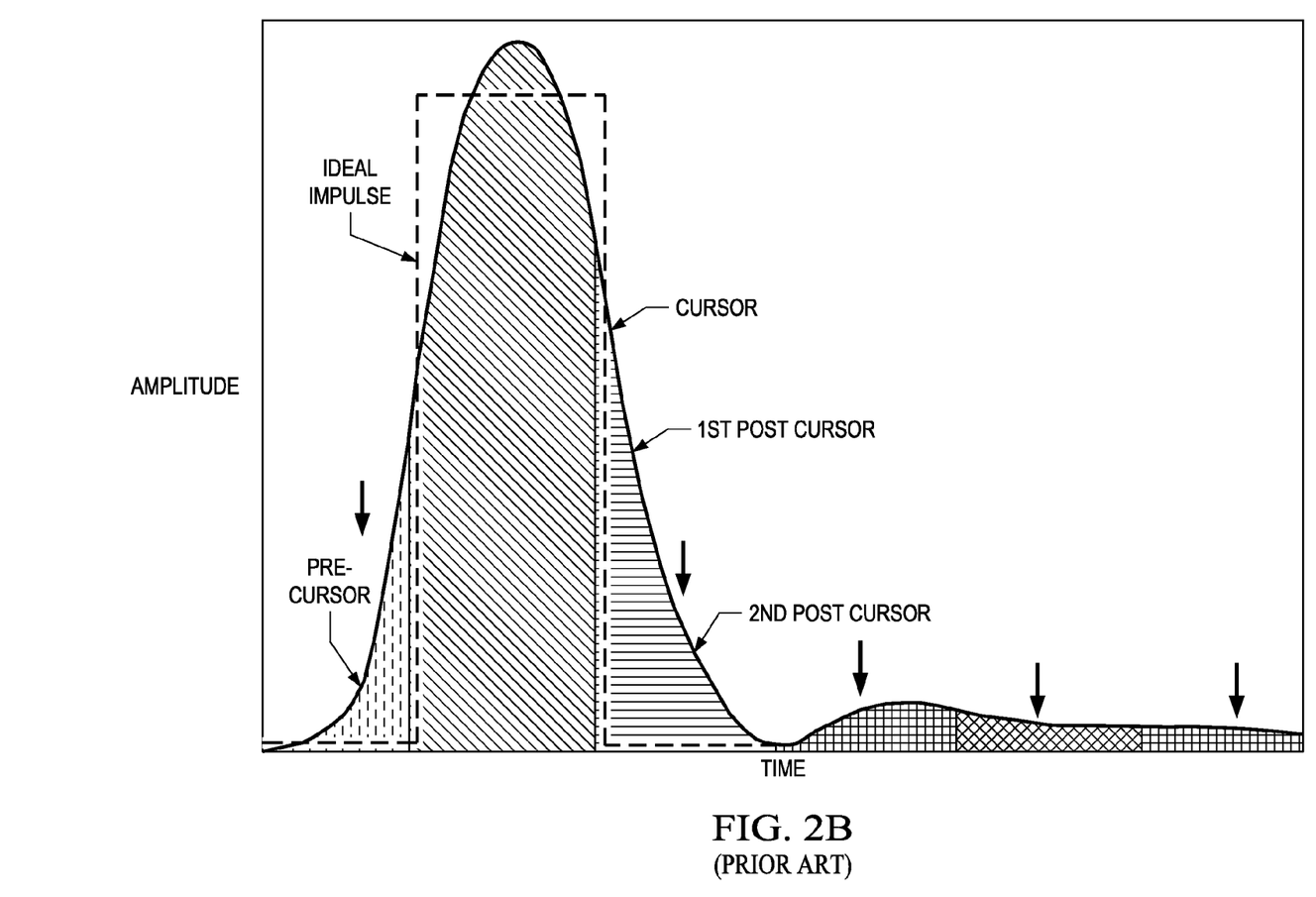

TX pre-emphasis EQ using FIR techniques is based on ISI cursor functions translated into FIR coefficients. Referring to FIGS. 2A/2B, ISI can be characterized in terms of an impulse response measured at the RX end. The ideal impulse for a current bit defines a main cursor, with the impulse response including energy in the adjacent bit intervals: pre-cursor energy of a previous bit that affects the current bit, and post-cursor energy of the next bit that affects the current bit.

SerDes com systems can use link training to adjust TX pre-emphasis EQ for channel conditions, improving ISI performance. For link training, the RCVR signals back to the XMTR link training information used by the XMTR to adjust TX pre-emphasis EQ, for example incrementing or decrementing TX pre-emphasis EQ, such as by adjusting FIR coefficients. In FIG. 1, this link training operation is illustrated in the TX signal waveforms as a change in post cursor increment.

However, conventional link training will not operate with SerDes corn links configured with a retiming receiver. Re-timing elements (RTEs) regenerate the received data without ISI equalization effects, i.e., without propagating to the output of the re-timing element any signal characteristics of the TX pre-emphasis EQ embodied in the data received at the input to the re-timing element (RTE). Thus, in FIG. 1, data re-timing/re-clocking prevents the RX ASIC from extracting any ISI cursor information representative of any change in TX pre-emphasis EQ (post cursor increment). In the context for FIR signal generation in the XMTR and the RCVR, re-timing/re-clocking prevents FIR cursor information (as reflected in FIR coefficients) for the received TX signal from propagating to the RX ASIC, through re-timing element.

BRIEF SUMMARY

This Brief Summary is provided as a general introduction to the Disclosure provided by the Detailed Description and Figures, summarizing some aspects and features of the disclosed invention(s). It is not a complete overview of the Disclosure, and should not be interpreted as identifying key elements or features of the invention, or otherwise characterizing or delimiting the scope of the invention(s) disclosed in this Patent Document.

The Disclosure describes apparatus and methods for SerDes communications including link training. A SerDes communications link includes a transmitter and a retiming receiver configured for data communication over a channel. The retiming receiver includes a link training unit (LTU) operable in link training (LT) mode according to aspects and features of the link training methodology.

SerDes communication can include transmitting, from the transmitter with a TX FIR channel driver, TX_EQ Data signals with TX pre-emphasis EQ, based on adjustable TX_EQ FIR coefficients, and receiving, in the retiming receiver, the TX_EQ Data signals, at an RTE input as RX Data signals. In the retiming receiver, the RX Data signals received at the RTE input are re-timed to generate corresponding RT Data with an RT clock, and from the RT Data and RT clock, RT_RX Data signals are generated at an RT output, with an RT FIR driver based on adjustable RT FIR coefficients. The retiming receiver can also perform receiver equalization on the TX_EQ Data signals received from the channel prior to re-timing the RX Data signals.

The link training methodology can include: (a) providing the adjustable RT FIR coefficients to the RT FIR circuit based on (i) RT_RX impulse cursor information corresponding to the RT_RX Data signals output at the RT output and generated by the RT FIR circuit with RT FIR coefficients; and (ii) RTE impulse cursor information corresponding to the RX Data signals received at the RTE input, which are transmitted with TX_EQ FIR coefficients; such that (iii) the RT FIR coefficients used to generate the RT_RX Data signals at the RT output are adjusted to correspond to the TX_EQ FIR coefficients used to transmit the TX_EQ Data signals (with TX pre-emphasis EQ), as reflected in the RX Data signals received at the RTE input; (b) communicating LT_EQ information based on the RT_RX Data signals output from the RT FIR circuit with the adjusted RT FIR coefficients; and (c) adjusting, based on the LT_EQ information, the TX_EQ FIR coefficients used to transmit the TX_EQ Data signals, including adjusting TX pre-emphasis EQ.

In other aspects and features, the methodology can include: (a) determining pre-cursor information corresponding to the RX Data signals at the RTE input, (b) providing main-cursor information corresponding to a comparison of RTE main-cursor information for the RX Data signals at the RTE input, and RT main-cursor information for the RT_RX Data signals at the RT output, (c) providing post-cursor information corresponding to a comparison of RTE post-cursor information for the RX Data signals at the RTE input, and RT post-cursor information for the RT_RX Data signals at the RT output, and (d) generating, from the pre-cursor information, the main-cursor information, and the post-cursor information, through convergence the adjusted RT FIR coefficients used by the RT FIR circuitry to generate RT_RX Data signals.

In other aspects and features, the methodology can include determining pre-cursor information by (a) generating a digital ramp that starts at reset of a pre-cursor unit interval, and increments in one LSB steps until it intersects RX Data corresponding to the RX Data signals at the RTE input within the pre-cursor unit interval, and (b) sampling the digital ramp, and generating the pre-cursor information.

In other aspects and features, the methodology can include: (a) providing main cursor information is accomplished by (i) low-pass filtering and detecting impulse energy associated with the RT_RX Data signals from the RT output, and generating the RT main-cursor information, (ii) low-pass filtering and detecting impulse energy associated with the RX Data signals at the RTE input, and generating the RTE main-cursor information, and (iii) comparing the RT main-cursor information and the RTE main-cursor information, and generating the main-cursor information; (b) providing the post-cursor information is accomplished by (i) band-pass filtering and detecting impulse energy associated with the RT_RX Data signals from the RT output, and generating the RT post-cursor information, (ii) band-pass filtering and detecting impulse energy associated with the RT_RX Data signals at the RTE input, and generating the RTE post-cursor information, and (iii) comparing the RT post-cursor information and RTE post-cursor information, and generating the post-cursor information.

In other aspects and features, the methodology can include operating the SerDes communication link with continuous link training, including generating the adjusted RT FIR coefficients at a coefficient update rate that is substantially less than a TX data rate used in generating the TX_EQ Data signals.

Other aspects and features of the invention(s) disclosed in this Patent Document will be apparent to those skilled in the art from the following Disclosure.

BRIEF DESCRIPTION OF THE DRAWINGS

FIG. 3 illustrates an example functional embodiment of a SerDes communication link including a retiming receiver operable in Link Training (LT) mode, in which the XMTR including a TX FIR channel driver transmits TX_EQ Data (with TX pre-emphasis EQ) based on TX_EQ FIR coefficients, and the RCVR, which includes a RT (re-timing) element and RT FIR driver in the RX Path, is configured with a Link Training Unit (LTU) coupled between an RTE input to the RT element and an RT output of the RT FIR driver, and operable in LT mode to adjust the RT FIR coefficients in the RT FIR to correspond to the TX_EQ FIR coefficients used to generate the TX_EQ Data, based on impulse cursor information for corresponding RX Data received at the RTE input and RT_RX Data output from the RT FIR, in effect performing a linear FIR translation from TX_EQ FIR coefficients to adjusted RT FIR coefficients.

FIG. 4 illustrates an example circuit embodiment of a SerDes retiming receiver operable Link Training (LT) mode, and including a Link Training Unit (LTU) coupled between an RTE input to an RT element and an RX output from an RT FIR driver, the LTU including pre-cursor detection and main/post cursor detection loops, and including a finite state machine (FSM) that generates by convergence adjusted RT FIR coefficients based on (a) RTE impulse cursor information corresponding to the RX Data signal received at the RTE input (transmitted with TX_EQ FIR coefficients), and (b) RT impulse cursor information corresponding to the RT_RX Data signal at the RT output of the RT FIR (based on RT FIR coefficients), such that (c) the adjusted RT FIR coefficients correspond to the RX data received at the RT input, based on the TX_EQ Data (TX pre-emphasis EQ) transmitted with TX_EQ FIR coefficients.

DETAILED DESCRIPTION

This Description and the Figures disclose example embodiments and applications that illustrate various features and advantages of the invention, aspects of which are defined by the Claims. Known circuits, functions and operations are not described in detail to avoid unnecessarily obscuring the principles and features of the invention.

In brief overview, a SerDes communications link includes a XMTR (transmitter) and a retiming RCVR (receiver) providing data communications over a communication channel, with the XMTR and retiming RCVR operable in a link training (LT) mode. The XMTR is configured to transmit over the channel TX_EQ Data signals with TX pre-emphasis EQ, including TX circuitry configured to generate TX Data, and TX FIR circuitry configured to generate, from the TX Data, the TX_EQ Data signals based on adjustable TX_EQ FIR coefficients, and is operable in LT mode to adjust the TX_EQ FIR coefficients, and thereby adjust TX pre-emphasis EQ, in response to LT_EQ information received from the RCVR. The RCVR is configured with an RX path that includes (a) an RT (re-timing) element with an RTE input, configured to receive from the channel RX Data signals at the RTE input, and re-time the RX Data signals to generate corresponding RT Data with an RT clock, (b) RT FIR circuitry with an RT output, configured to generate, from the RT Data and RT clock, RT_RX Data signals based on adjustable RT FIR coefficients, and (c) RX circuitry coupled to receive the RT_RX Data signals from the RT FIR circuitry. The RCVR further includes a link training unit (LTU) coupled between the RTE input and the RT output, and operable in the LT mode to provide to the RT FIR circuitry adjusted RT FIR coefficients based on: (a) RT_RX impulse cursor information corresponding to the RT_RX Data signals output at the RT output and generated by the RT FIR circuitry with RT FIR coefficients; and (b) RTE impulse cursor information corresponding to the RX Data signals received at the RTE input, which are transmitted with TX_EQ FIR coefficients; such that (c) the RT FIR coefficients used to generate the RT_RX Data signals at the RT output are adjusted to correspond to the TX_EQ FIR coefficients used to transmit the TX_EQ Data signals (with TX pre-emphasis EQ), as reflected in the RX Data signals received at the RTE input. In LT mode, the RX circuitry is configured to communicate to the TX circuitry the LT_EQ information based on the RT_RX Data signals output from the RT FIR circuitry with the adjusted RT FIR coefficients, and the TX circuitry is configured to adjust, based on the LT_EQ information received from the RX circuitry, the TX_EQ FIR coefficients used to generate TX_EQ Data signals, including adjusting TX pre-emphasis EQ.

In other embodiments: (a) the RCVR RX path can include a receive equalization circuit coupled between the channel and the RTE input, and configured to provide receive equalization; (b) the TX circuitry can be configured to generate TX Data with an embedded clock, and the RT element can include retimer circuitry including a clock data recovery circuit configured to recover the embedded clock as the RT clock; and (c) the LTU can include (i) pre-cursor detect circuitry configured to determine pre-cursor information corresponding to the RX Data signals from the RTE input, (ii) main-cursor detection loop circuitry configured to provide main-cursor information corresponding to a comparison of RTE main-cursor information for the RX Data signals at the RTE input, and RT main-cursor information for the RT_RX Data signals at the RT output, (iii) post-cursor detection loop circuitry configured to provide post-cursor information corresponding to a comparison of RTE post-cursor information for the RX Data signals at the RTE input, and RT post-cursor information for the RT_RX Data signals at the RT output; and (iv) a finite state machine configured to receive the pre-cursor information, the main-cursor information, and the post-cursor information, and generate through convergence the adjusted RT FIR coefficients used by the RT FIR circuitry to generate RT_RX Data signals.

Figure 3:
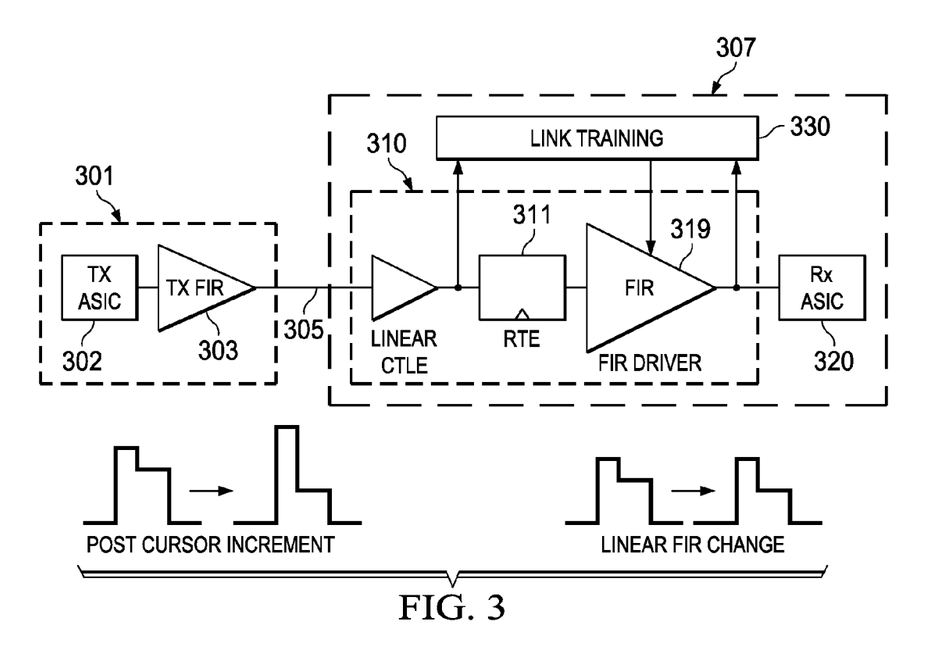

FIG. 3 illustrates an example functional embodiment of SerDes communication link 300, including a Retiming Receiver operable in Link Training (LT) mode. SerDes link 300 includes a Transmitter (XMTR) 301 and a Retiming Receiver (RCVR) 307, which communicate over a corn channel 305. SerDes links can operate bi-directionally, with TX/RX on both ends.

XMTR 301 is implemented with a TX ASIC 302 and a TX FIR channel driver 303. TX ASIC 302 generates serialized TX Data, and TX FIR 303 drives corresponding TX Data signals out to the channel 305. TX FIR channel driver 303 is configured for operation with adjustable FIR coefficients, supplied by TX ASIC 302.

XMTR 301 provides TX pre-emphasis equalization (EQ) to counteract ISI (intersymbol interference) effects of the lossy channel 305. TX ASIC 302 adjusts TX pre-emphasis EQ (including TX pre-emphasis EQ that is adjusted as a result of link training) by supplying corresponding TX_EQ FIR coefficients to TX FIR driver 303. TX FIR 303 outputs TX_EQ Data signals, with TX pre-emphasis EQ, corresponding to the TX_EQ FIR coefficients.

Retiming RCVR 307 receives the TX_EQ Data signals over channel 305. RCVR 307 includes, in the RX Path, a re-timing element 310 and an RX ASIC 320. RT element 310 includes re-timing/re-clocking circuitry 311 and an RT FIR signal driver 319. RT FIR 319 is configured for operation with adjustable RT FIR coefficients.

RT element 310 includes an RTE input at the input to RT (re-timing/re-clocking) circuitry 311, and an RT output at the output of RT FIR 319. RT element 310 can include analog receiver equalization, such as CTLE (continuous time linear equalization), in the RX Path in front of the RT circuitry 311.

RX Data signals received at the RTE input correspond to the TX_EQ Data signals, transmitted with TX pre-emphasis EQ, based on TX_EQ FIR coefficients, after channel losses and any receive equalization. That is, TX FIR channel driver 303 generates the TX_EQ Data signals (with TX pre-emphasis EQ) based on corresponding TX_EQ FIR coefficients supplied by TX ASIC 302. The TX_EQ Data signals are communicated over the lossy corn channel 305, and in some embodiments may undergo receiver equalization in the RX Path in front of the RTE input.

The RX Data signals received at the RTE input to RT circuitry 311 are re-timed/re-clocked as RT Data, including a recovered or locally generated RT Clock. RT Data/Clock are input to RT FIR driver 319. RT FIR 319 generates RT_RX Data signals based on adjustable RT FIR coefficients. RT_RX Data signals are available at the RT output of FIR 319, for input to RX ASIC 320.

The RX Data signals received at the RTE input reflect the TX pre-emphasis EQ, and corresponding TX_EQ FIR coefficients, used to generate the transmitted TX_EQ Data signals. As noted, however, as a result of re-timing/re-clocking the RX Data signals in RT element 310, the RT_RX Data signals generated by RT FIR 319 (based on current RT FIR coefficients) will not reflect TX pre-emphasis EQ, and in particular, any change in TX pre-emphasis EQ, such as for link training. That is, any change in TX-EQ FIR coefficients, which is reflected in the RX Data signals received at the RTE input to RT circuitry 311, will not propagate to the RT_RX Data signals at the RT output of RT FIR 319. Instead, the RT_RX Data signals are generated by RT FIR 319 based on the existing RT FIR coefficients. As a result, any change in TX pre-emphasis EQ (TI_EQ FIR coefficients) will not be propagated to RX ASIC 320.

To enable link training transparency, RCVR 307 includes a Link Training Unit (LTU) 330 coupled in parallel with the RX Path, between the RTE input and the RT output of RT element 310. LTU 330 receives as inputs the RX Data signals from the RTE input to RT circuitry 311, and the RT_RX Data signals output from the RT output of RT FIR driver 319.

LTU 330 generates the adjusted RT FIR coefficients based on impulse cursor information for the RT_RX Data signals output from RT element 310, as compared to impulse cursor information for the RX Data signals input to RT circuit 311. Specifically, LTU 330 adjusts the RT FIR coefficients use to generate the RT_RX Data signals output from RT element 310 based on: (a) RT_RX impulse cursor information corresponding to the RT_RX Data signals generated by RT FIR 319 with RT FIR coefficients; and (b) RTE impulse cursor information corresponding to the RX Data signals received at the RTE input (transmitted with TX_EQ FIR coefficients). By operation of LTU 330, the RT FIR coefficients used by RT FIR driver 319 to generate the RX Data signals at the RT output are adjusted to correspond to the TX_EQ FIR coefficients used to transmit the TX_EQ Data signals (with TX pre-emphasis EQ), as reflected in the RX Data signals received at the RTE input.

LTU 330 forwards TX FIR changes, corresponding to changes in TX pre-emphasis EQ, to the RT FIR 319, around the RT (re-timing/re-clocking) circuitry 311. In effect, LTU 330 performs a linear FIR translation from the TX_EQ FIR coefficients used to transmit TX_EQ Data signals with a selected TX pre-emphasis EQ, which are received as RX Data signals at the RTE input, to corresponding adjusted RT FIR coefficients used to output RT_RX Data signals from the RT output, propagating changes in TX pre-emphasis EQ around the RT circuitry 311.

RT_RX Data signals output from RT element 310 are input to RX ASIC 320. For LT mode, RX ASIC 320 is configured to return to the XMTR 301 (TX ASIC 302), LT_EQ information based on the RT_RX Data signals output from the RT FIR circuitry. The LT_EQ information reflects the effect of link training changes in TX pre-emphasis EQ on RX Data signals received by RX ASIC 320, as represented by adjustments to the RT FIR coefficients used by the RT FIR driver in outputting the RX Data signals.

XMTR 301 uses the LT_EQ information returned by RX ASIC 320 to adjust TX pre-emphasis EQ for the TX_EQ Data signals. Specifically, TX ASIC 302 is configured to adjust, based on the LT_EQ information received from RX ASIC 308, TX_EQ FIR coefficients used by the TX FIR channel driver to generate TX_EQ Data signals with TX pre-emphasis EQ, including changes in TX pre-emphasis EQ as a result of link training operations.

The link training transparency provided by RCVR 307 including LTU 330, is illustrated by the TX and RX waveforms in FIG. 3. The TX_EQ Data signal waveforms exhibit a change in TX pre-emphasis EQ represented as a change in post-cursor increment, corresponding to a change in TX_EQ FIR coefficients used to transmit the TX_EQ Data signals (with TX pre-emphasis EQ). The RX Data signal waveforms exhibit a corresponding change in post-cursor increment based on link training adjustment to the RT FIR coefficients used to generate the RT_RX Data signals.

The example embodiment of a SerDes communication link 300 described above in connection with FIG. 3 includes a Retiming Receiver 307 operable in Link Training (LT) mode including an LTU 330. A SerDes corn link can be configured/adapted for intermittent or continuous LT mode (RT FIR coefficient update). For intermittent LT mode operation, the XMTR/RCVR are configured/adapted for intermittent link training operations during which LTU 330 operates to update the RT FIR coefficients, which are then fixed in RT FIR 319 until the next LT operation. Alternatively, the XMTR/RCVR can be configured/adapted to operate continuously in LT mode, with LTU 330 configured to continuously generate adjusted RT FIR coefficients at a coefficient update rate that is substantially less than the TX Data rate of XMTR 301 (TX ASIC 302), reducing high frequency jitter from RT FIR coefficient (digital) input to RT FIR 319, so that RT FIR changes for link training occur smoothly during normal data communications.

Figure 4:
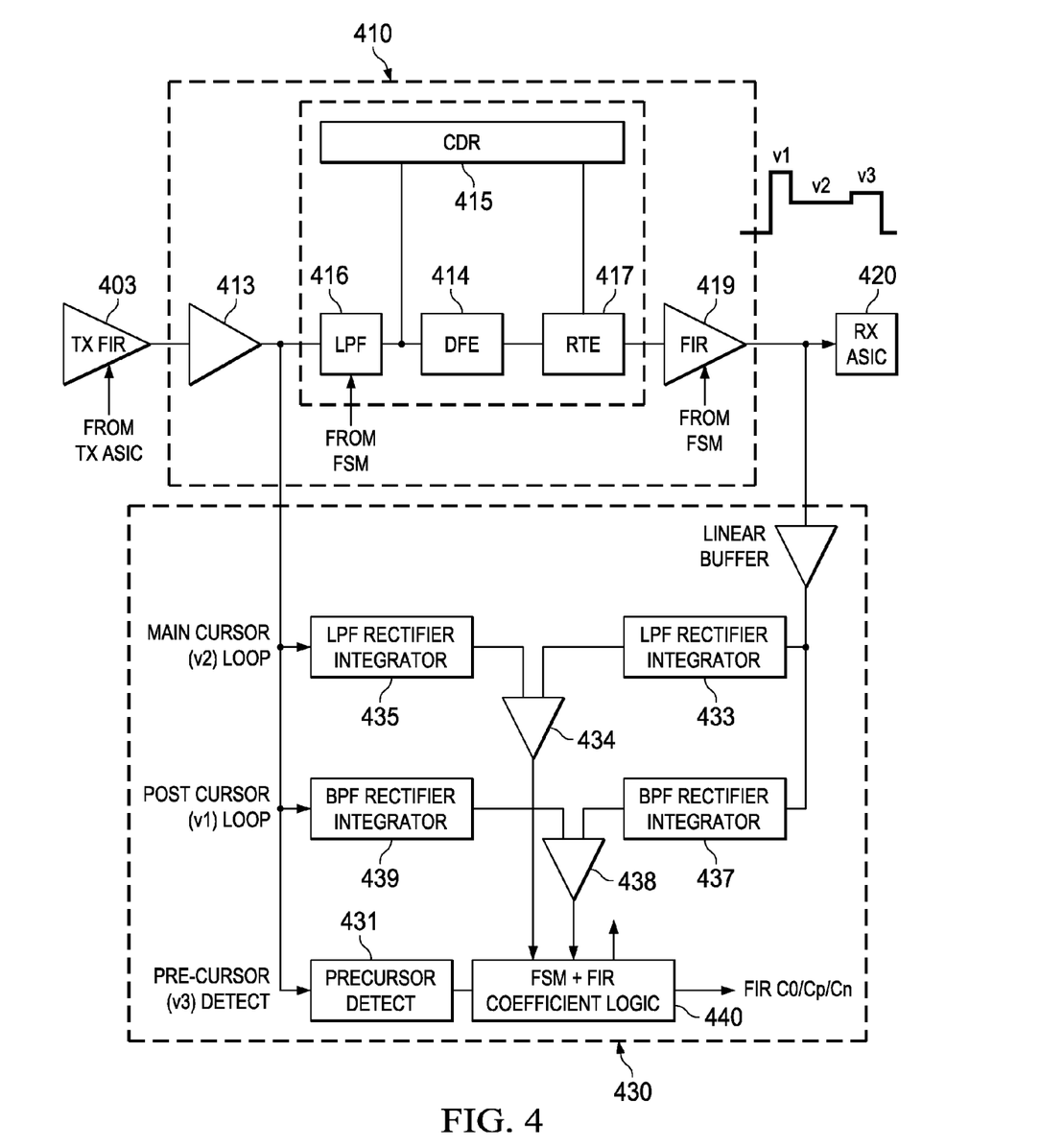

FIG. 4 illustrates an example circuit embodiment of a SerDes retiming RCVR 407 operable in Link Training (LT) mode. RCVR 407 and XMTR 401 form a SerDes com link for communication over a com channel 405.

From above, XMTR 401 generates serialized TX_EQ Data with TX pre-emphasis EQ, to counteract ISI (intersymbol interference) effects introduced by the lossy com channel 405. XMTR 401 transmits TX_EQ Data signals (with TX pre-emphasis EQ) based on TX_EQ FIR coefficients.

RCVR 407 receives the TX_EQ Data signals from com channel 405. The example retiming RCVR 407 includes a re-timing element implemented as a CTLE Retimer 410, and an RX ASIC 420. CTLE Retimer 410 includes a RT (retiming) circuit 411 with a FIR signal output driver 419. CTLE retimer 410 also includes both analog and digital receiver equalization: CTLE (continuous time linear equalizer) 413, interfaced to channel 405 at the RTE input to RT circuit 411, and a DFE (decision feedback equalizer) 414 included in RT circuit 411.

Thus, the RX Path through RCVR 407 includes CTLE 413, RT circuit 411, FIR driver 419 and RX ASIC 420. CTLE 413 is interfaced between channel 405 and the RTE input to RT circuit 411. Thus, the RX Data signals at the RTE input to RT circuit 411 correspond to the TX_EQ Data signals transmitted by XMTR 401 and received over channel 405, after CTLE. For LT mode, CTLE is adapted and fixed before link training begins.

RT circuit 411 performs conventional data re-timing, modifying data edge timing so that the data edges have a defined timing relation with respect to a bit clock. For the example embodiment, XMTR 401 (TX ASIC 302 in FIG. 3) generates and transmits TX_EQ Data with an embedded bit clock. RT circuit 411 implements CDR (clock data recovery) 415 to recover the embedded RT Clock. A low pass filter 416 can be used to reduce the effect of strong pre-emphasis EQ on the CDR. RTE flip-flops 417 are clocked by the CDR to generate re-timed RT Data.

RT Data/Clock from RT circuit 411 is input to RT FIR signal driver 419, configured for operation with adjustable RT FIR coefficients. RT FIR 419 drives out RT_RX data signals available at the RT output of Retimer 410 (output of RT FIR 419).

RCVR 407 includes a Link Training Unit (LTU) 430 coupled in parallel with the RX Path, between the RTE input to RT circuit 411 and the RT output of RT FIR driver 419. In LT mode, LTU 430 receives as inputs the RX Data signals from the RTE input, and the RT_RX Data signals output from RT FIR driver 419, available at the RT output of Retimer 410, and generates adjusted RT FIR coefficients corresponding to the TX_EQ FIR coefficients used to generate the TX_EQ Data signals, with TX pre-emphasis EQ, as reflected in the RX Data signals received at the RTE input to RT circuit 411.

LTU 430 generates the adjusted RT FIR coefficients based on impulse cursor information for the RT_RX Data signals output from RT FIR 419, as compared to impulse cursor information for the RX Data signals input to RT circuit 411. Specifically, LTU 330 adjusts the RT FIR coefficients use to generate the RT_RX Data signals output from Retimer 410 based on: (a) RT_RX impulse cursor information corresponding to the RT_RX Data signals generated by RT FIR 419 with RT FIR coefficients; and (b) RTE impulse cursor information corresponding to the RX Data signals received at the RTE input (transmitted with TX_EQ FIR coefficients). By operation of LTU 430, the RT FIR coefficients used by RT FIR driver 419 to generate the RX Data signals at the RT output are adjusted to correspond to the TX_EQ FIR coefficients used to transmit the TX_EQ Data signals (with TX pre-emphasis EQ), as reflected in the RX Data signals received at the RTE input.

LTU 430 is implemented with cursor detection circuitry that generates the RTE and RT_RX impulse cursor information, and a finite state machine (FSM) 440 that generates by convergence the RT FIR coefficients. LTU 430 includes pre-cursor detect circuitry 431, main-cursor detection loop circuitry 433/434/435, and post-cursor detection loop circuitry 437/438/439.

Impulse cursor information (pre/main/post) is input to FSM 440, which generates by convergence RT FIR coefficients corresponding to the TX_EQ FIR coefficients used to generate the TX_EQ Data signals (with TX pre-emphasis EQ), as reflected in the RX Data signals received at the RTE input (RTE impulse cursor information). FSM 440 effects a linear FIR translation from the TX_EQ FIR coefficients used to transmit TX_EQ Data signals with a selected TX pre-emphasis EQ (received as RX Data signals at the RTE input), to corresponding adjusted RT FIR coefficients used to output RT_RX Data signals from the RT output, thereby propagating changes in TX pre-emphasis EQ around the RT circuit 411.

The example embodiment uses energy detection to determining LT cursor information, which cannot distinguish between precursor energy and postcursor energy. Precursor is therefore approximated before, or in conjunction with, the energy based approach used to determine postcursor. For the example embodiment, precursor detection is performed prior to main/post cursor determination.

Pre-cursor detect circuitry 431 is configured to determine pre-cursor information corresponding to the RX Data signals at the RTE input. Main-cursor detection loop circuitry 433/434/435 is configured to determine main-cursor (lower frequency) information corresponding to a comparison of main-cursor energy/information for the RT_RX Data signals at the RT output, and main-cursor energy/information for the RX Data signals from the RTE input. Post-cursor detection loop circuitry 437/438/439 is configured to provide post-cursor (higher frequency) information corresponding to a comparison of post-cursor energy/information for the RT_RX Data signals at the RT output, and post-cursor energy/information for the RX Data signals from the RTE input.

FSM 440 is configured to receive the pre-cursor information, the main-cursor information, and the post-cursor information, and generate through convergence the RT FIR coefficients (C0/Cp/Cn), which are input to RT FIR driver 419. Specifically, FSM 430 adjusts the RT FIR coefficients supplied to RT FIR 419 until the RT_RX cursor energy/information characterizing the RT_RX Data signals output from the RT FIR (based on the RT FIR coefficients supplied by the FSM) converge with the RTE cursor energy/information characterizing the RX Data signals from the RTE input (transmitted with TX_EQ FIR coefficients). By operation of LTU 430 including FSM 440, the RT FIR coefficients used by RT FIR driver 419 to generate the RX Data signals at the RT output are adjusted to correspond to the TX_EQ FIR coefficients used to transmit the TX_EQ Data signals (with TX pre-emphasis EQ), as reflected in the RX Data signals received at the RTE input.

Figure 5A:
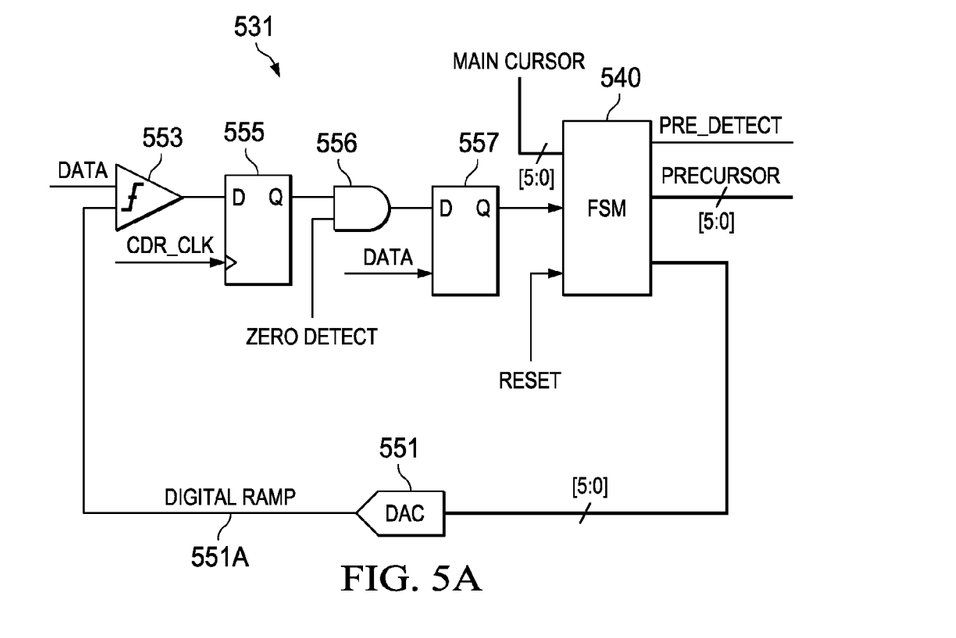
FIGS. 5A/5B/5C illustrate LTU pre-cursor detection for generating pre-cursor information used by the LTU FSM in generating adjusted RT FIR coefficients: (5A) illustrates an example embodiment of the LTU pre-cursor detection circuit; (5B) illustrates pre-cursor detection using a digital ramp; and (5C) illustrates an example FSM state diagram for pre-cursor detection.
Figure 5B:
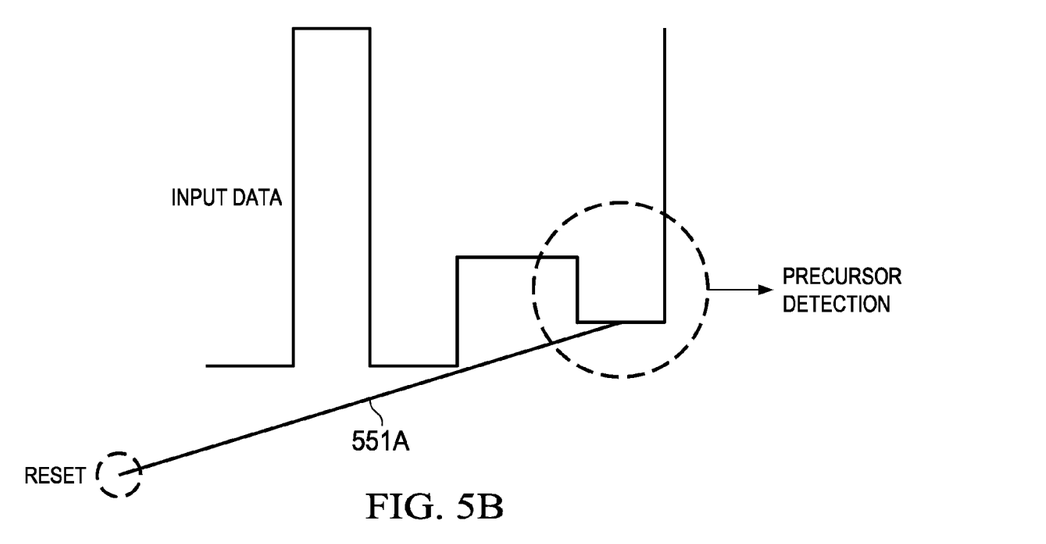

FIG. 5A/5B illustrates an example embodiment of the LTU pre-cursor detection circuit. Pre-cursor detection circuit 531 includes a DAC 551 that generates a digital ramp 551A that starts at reset (signaled by FSM 540) of a pre-cursor unit interval, and increments in one LSB steps. Pre-cursor is detected by comparator 553 when the ramp intersects the input RX Data signal within the pre-cursor unit interval.

The ramp output of comparator 553 is sampled by flip-flop 555 clocked by the CDR (FIG. 4, 415). AND gate 556 is used to confirm pre-cursor detection as a succession of two 0's. A pre-cursor will occur at the rising edge following a succession of at least two 0's, or at the falling edge following a succession of at least two 1's. That is, pre-cursor detection requires the detection of a succession of two or more 0's or 1's. For the example embodiment, a succession of two 0's was used, signaled by the zero detect input to AND 556.

Flip-Flop 557 is clocked by data, ensuring that only the trailing bit corresponding to the pre-cursor is captured. In effect, this flop filters out post cursors.

FIG. 5B illustrates this ramp function. Ramp 551A starts increasing when reset (from FSM 540) goes low, and stops when the first valid precursor is detected.

Figure 5C:
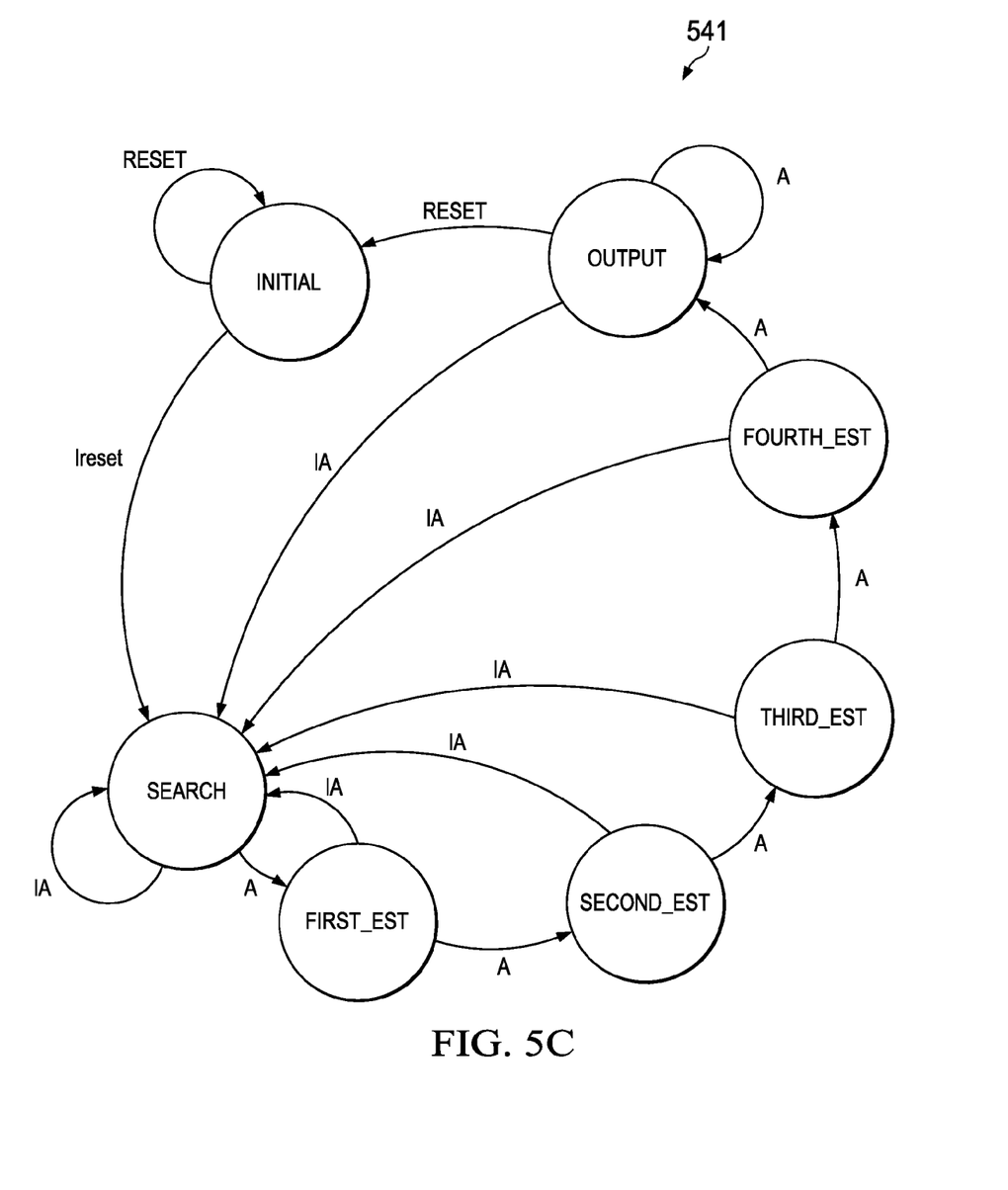

FIG. 5C illustrates an example FSM state diagram for pre-cursor detection. For the example embodiment, to prevent false detections, the ramp is held until five valid precursors are detected, signaled by FSM pre_detect active.

The example state transitions are: (1) INITIAL—set all registers to zero; (2) SEARCH—increase ramp by one LSB; (3) FIRST_EST—keep current ramp value; (4) SECOND_EST—keep current ramp value; (5) THIRD_EST—keep current ramp value; (6) FOURTH_EST—keep current ramp value; (7) OUTPUT—keep current ramp value and assert pre_detect.

Referring to FIG. 4, LTU 430 main-cursor detection loop 433/434/435 and post-cursor detection loop 437/438/439 are implemented as feedback loops that operate continuously in ping-pong fashion to replicate by convergence the TX_EQ FIR coefficients used to generate (TX FIR 303 in FIG. 3) the TX_EQ Data signals (with TX pre-emphasis EQ), which are received as RX Data signals at the RTE input. The loops can be relatively fast tracking (on the order of microseconds) to allow near-real-time replication of the adjusted RT FIR coefficients used to generate the RX Data signals supplied to RX ASIC 420. The loops can be configured to bang-bang upon convergence.

The main-cursor detection loop includes output/input main cursor (lower frequency) detection circuitry 433/435 configured to low-pass filter respectively the RT_RX (RT output) and RX (RTE input) Data signals, and then extract impulse cursor energy by rectification/integration. A main-cursor loop comparator 434 compares the output and input main-cursor energy information, and provides input to FSM 440.

The post-cursor detection loop includes output/input post-cursor (higher frequency) detection circuitry 437/439 configured to band-pass filter respectively the RT_RX (RT output) and RX (RTE input) Data signals, and then extract impulse cursor energy by rectification/integration. A post-cursor loop comparator compares the input and output post-cursor energy information, and provides input to FSM 440.

Figure 6A:
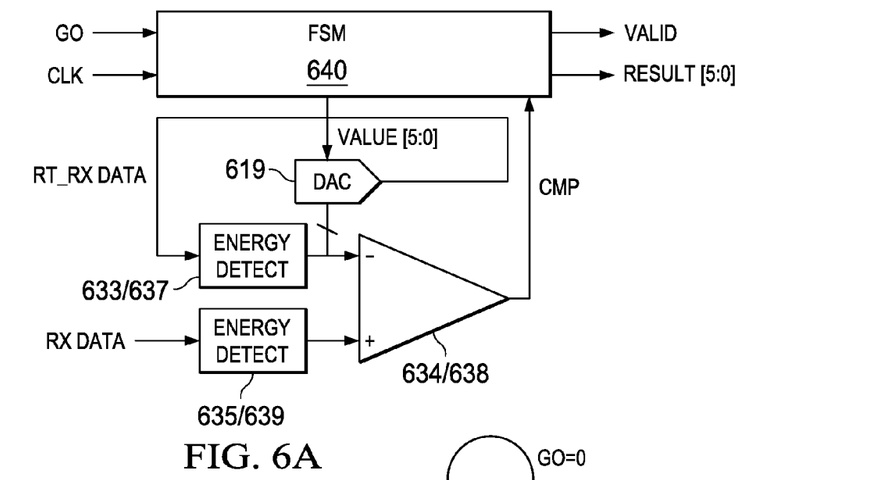
FIGS. 6A/6B illustrate LTU main/post cursor detection for generating main and post cursor information used by the LTU FSM in generating adjusted RT FIR coefficients: (5A) illustrates an example functional embodiment of the LTU main/post cursor loops; and (5B) illustrate an example FSM state diagram for main/post cursor detection.
Figure 6B:
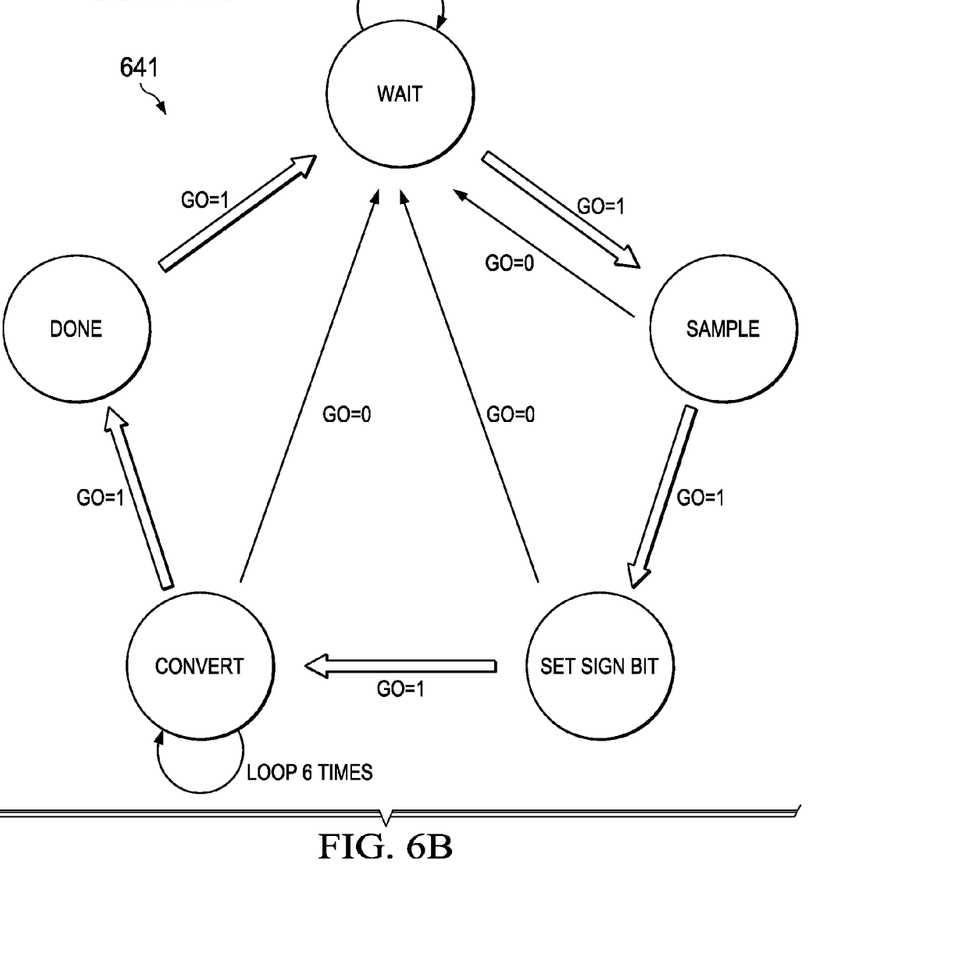

FIGS. 6A/6B functionally illustrate LTU main/post cursor detection for generating main and post cursor energy information used by LTU FSM 440 in adjusting RT FIR coefficients to effectively replicate the TX_EQ FIR coefficients (effectively forwarding the TX_EQ FIR coefficients used to generate the TX_EQ Data signals received at the RTE input as RX Data signals). Cursor replication is illustrated in FIG. 4 by the v1/v2/v3 (post/main/pre) cursor representation, in which v1-post and v3-pre cursors are represented as positive (higher frequency) cursor energy.

For the example embodiment, the basic operation of the main/post cursor detection/estimation loops is identical (although resolution can be different), and based on binary search successive approximation used to estimate main/post cursor energy.

The RT FIR driver (FIR 419 in FIG. 4) is functionally represented by DAC 619, which outputs RT_RX Data signals. Impulse cursor information for output RT_RX and input RX Data signals is determined by energy detection 633/637 and 635/639, and the comparison 634/638 used by FSM 440 to converge on adjusted RT FIR coefficients by binary search successive approximation. For an example 6-bit output resolution[5:0], a successive approximation for FIR coefficient computation can use 6 bit coefficient values, and 6 cycles for each loop to converge. Binary search starts with the MSB and proceeds to the LSB. Six comparisons are used for the binary search. Comparator output 634/638 is a logic 1 if the RLT_EQ voltage is greater than the RX output of the DAC (FIR driver), and 0 otherwise (the loops bang-bang on convergence).

Referring to FIG. 6B, at any point if go is 0 the circuit is reset. When go becomes active 1, energy estimation and conversion (convergence) is performed. When a conversion is complete, FSM valid is set to 1 and the RT FIR coefficient result is available.

Example state transitions are: (1) Wait: Set all registers to zero if go is zero else move to Sample state on next clock; (2) Sample: Assert sample signal; (3) Set Sign Bit: Set sign bit to zero or one for positive or negative values respectively; (4) Convert: Perform binary search successive approximation to estimate analog value; (5) Done: Assert valid signal and wait for next clock to move to wait state For embodiments configured/adapted for continuous LT mode, the LTU can be configured for linear conversion/search to reduce high frequency jitter from RT FIR coefficient updates, so that RT FIR changes for link training occur smoothly during normal data communications.

The Disclosure provided by this Description and the Figures sets forth example embodiments and applications, including associated operations and methods, that illustrate various aspects and features of the invention. These example embodiments and applications may be used by those skilled in the art as a basis for design modifications, substitutions and alternatives to construct other embodiments, including adaptations for other applications, Accordingly, this Description does not limit the scope of the invention, which is defined by the Claims.

The invention claimed is:

1. A SerDes communications link system including a transmitter and a retiming receiver providing data communications over a channel, the SerDes communications link including a link training (LT) mode, comprising
   a XMTR circuit configured to transmit over the channel TX_EQ Data signals with TX pre-emphasis EQ, including
      TX circuitry configured to generate TX Data; and
      TX FIR circuitry configured to generate, from the TX Data, the TX_EQ Data signals based on adjustable TX_EQ FIR coefficients;
   the XMTR circuit operable in LT mode to adjust the TX_EQ FIR coefficients, and thereby adjust TX pre-emphasis EQ, in response to LT_EQ information;
   a RCVR circuit configured with an RX path including:
      a re-timing element (RTE) with an RTE input, configured to receive from the channel RX Data signals at the RTE input, and re-time the RX Data signals to generate corresponding RT Data with an RT clock;
      RT FIR circuitry with an RT output, configured to generate, from the RT Data and RT clock, RT_RX Data signals based on adjustable RT FIR coefficients; and
      RX circuitry coupled to receive the RT_RX Data signals from the RT FIR circuitry; and
   the RCVR circuit further including a link training unit (LTU) coupled between the RTE input and the RT output, and operable in the LT mode to provide to the RT FIR circuitry adjusted RT FIR coefficients based on:
      RT_RX impulse cursor information corresponding to the RT_RX Data signals output at the RT output and generated by the RT FIR circuitry with RT FIR coefficients; and
      RTE impulse cursor information corresponding to the RX Data signals received at the RTE input, which are transmitted with TX_EQ FIR coefficients;
      such that the RT FIR coefficients used to generate the RT_RX Data signals at the RT output are adjusted to correspond to the TX_EQ FIR coefficients used to transmit the TX_EQ Data signals (with TX pre-emphasis EQ), as reflected in the RX Data signals received at the RTE input;
   wherein, in LT mode,
      the RX circuitry is configured to communicate to the TX circuitry the LT_EQ information based on the RT_RX Data signals output from the RT FIR circuitry with the adjusted RT FIR coefficients; and
      the TX circuitry is configured to adjust, based on the LT_EQ information received from the RX circuitry, the TX_EQ FIR coefficients used to generate TX_EQ Data signals, including adjusting TX pre-emphasis EQ.

2. The system of claim 1, wherein the RCVR RX path further includes a receive equalization circuit coupled between the channel and the RTE input, and configured to provide receive equalization.

3. The system of claim 1, wherein
   the TX circuitry is configured to generate TX Data with an embedded clock, and
   the RT element comprises retimer circuitry including a clock data recovery circuit configured to recover the embedded clock as the RT clock.

4. The system of claim 1, wherein the LTU comprises:
   pre-cursor detect circuitry configured to determine pre-cursor information corresponding to the RX Data signals from the RTE input;
   main-cursor detection loop circuitry configured to provide main-cursor information corresponding to a comparison of RTE main-cursor information for the RX Data signals at the RTE input, and RT main-cursor information for the RT_RX Data at the RT output;
   post-cursor detection loop circuitry configured to provide post-cursor information corresponding to a comparison of RTE post-cursor information for the RX Data signals at the RTE input, and RT post-cursor information for the RT_RX Data signals at the RT output; and
   a finite state machine configured to receive the pre-cursor information, the main-cursor information, and the post-cursor information, and generate through convergence the adjusted RT FIR coefficients used by the RT FIR circuitry to generate RT_RX Data signals.

5. The system of claim 4, wherein the pre-cursor detect circuitry comprises:
   digital ramp circuitry configured to generate a digital ramp that starts at reset of a pre-cursor unit interval, and increments in one LSB steps until it intersects RX Data corresponding to the RX Data signals from the RTE input within the pre-cursor unit interval; and
   sampling circuitry configured to sample the digital ramp, and generate the pre-cursor information.

6. The system of claim 4, wherein:
   the main-cursor detection loop circuitry includes:
      main-cursor RT output circuitry configured to low-pass filter and detect impulse energy associated with the RT_RX Data signals from the RT output, and generate the RT main-cursor information;
      main-cursor RTE input circuitry configured to low-pass filter and detect impulse energy associated with the RX Data signals at the RTE input, and generate the RTE main-cursor information; and
      a main-cursor loop comparator configured to compare the RT main-cursor information and the RTE main-cursor information, and generate the main-cursor information;
   the post-cursor detection loop circuitry includes:
      post-cursor RT output circuitry configured to band-pass filter and detect impulse energy associated with the RT_RX Data signals from the RT output, and generate the RT post-cursor information;
      post-cursor RTE input circuitry configured to band-pass filter and detect impulse energy associated with the RX Data signals at the RTE input, and generate the RTE post-cursor information; and
      a post-cursor loop comparator configured to compare the RT post-cursor information and RTE post-cursor information, and generate the post-cursor information.

7. The system of claim 1, wherein the SerDes communication link operates continuously in LT mode, with the LTU generating adjusted RT FIR coefficients at a coefficient update rate that is substantially less than a TX Data rate used by the TX circuitry in generating the TX Data.

8. A retiming receiver circuit including a link training (LT) operating mode, the retiming receiver operable in a SerDes communications link providing data communications over a channel, the SerDes communications link including a XMTR circuit with TX FIR circuitry configured to transmit over the channel TX_EQ Data signals with TX pre-emphasis EQ, based on adjustable TX_EQ FIR coefficients, the retiming receiver comprising:
 a RCVR circuit configured with an RX path including:
  a re-timing element (RTE) with an RTE input, configured to receive from the channel RX Data signals at the RTE input, and re-time the RX Data signals to generate corresponding RT Data with an RT clock;
  RT FIR circuitry with an RT output, configured to generate, from the RT Data and RT clock, RT_RX Data signals based on adjustable RT FIR coefficients; and
  RX circuitry coupled to receive the RT_RX Data signals from the RT FIR circuitry; and
 the RCVR circuit further including a link training unit (LTU) coupled between the RTE input and the RT output, and operable in the LT mode to provide to the RT FIR circuitry adjusted RT FIR coefficients based on:
  RT_RX impulse cursor information corresponding to the RT_RX Data signals output at the RT output and generated by the RT FIR circuitry with RT FIR coefficients; and
  RTE impulse cursor information corresponding to the RX Data signals received at the RTE input, which are transmitted with TX_EQ FIR coefficients;
  such that the RT FIR coefficients used to generate the RT_RX Data signals at the RT output are adjusted to correspond to the TX_EQ FIR coefficients used to transmit the TX_EQ Data signals (with TX pre-emphasis EQ), as reflected in the RX Data signals received at the RTE input;
 wherein, in LT mode,
  the RX circuitry is configured to communicate to the TX circuitry LT_EQ information based on the RT_RX Data signals output from the RT FIR circuitry with the adjusted RT FIR coefficients; and
  the TX circuitry is configured to adjust, based on the LT_EQ information received from the RX circuitry, the TX_EQ FIR coefficients used to generate TX_EQ Data signals, including adjusting TX pre-emphasis EQ.

9. The retiming receiver circuit of claim 8, wherein the RCVR RX path further includes a receive equalization circuit coupled between the channel and the RTE input, and configured to provide receive equalization.

10. The retiming receiver circuit of claim 8, wherein the TX_EQ Data signals include an embedded clock; and
 wherein the RT element comprises retimer circuitry including a clock data recovery circuit configured to recover the embedded clock as the RT clock.

11. The retiming receiver circuit of claim 8, wherein the LTU comprises:
 pre-cursor detect circuitry configured to determine pre-cursor information corresponding to the RX Data signals from the RTE input;
 main-cursor detection loop circuitry configured to provide main-cursor information corresponding to a comparison of RTE main-cursor information for the RX Data signals at the RTE input, and RT main-cursor information for the RT_RX Data signals at the RT output;
 post-cursor detection loop circuitry configured to provide post-cursor information corresponding to a comparison of RTE post-cursor information for the RX Data signals at the RTE input, and RT post-cursor information for the RT_RX Data signals at the RT output; and
 a finite state machine configured to receive the pre-cursor information, the main-cursor information, and the post-cursor information, and generate through convergence the adjusted RT FIR coefficients used by the RT FIR circuitry to generate RT_RX Data signals.

12. The retiming receiver circuit of claim 11, wherein the pre-cursor detect circuitry comprises:
 digital ramp circuitry configured to generate a digital ramp that starts at reset of a pre-cursor unit interval, and increments in one LSB steps until it intersects RX Data corresponding to the RX Data signals from the RTE input within the pre-cursor unit interval; and
 sampling circuitry configured to sample the digital ramp, and generate the pre-cursor information.

13. The retiming receiver circuit of claim 11, wherein:
 the main-cursor detection loop circuitry includes:
  main-cursor RT output circuitry configured to low-pass filter and detect impulse energy associated with the RT_RX Data signals from the RT output, and generate the RT main-cursor information;
  main-cursor RTE input circuitry configured to low-pass filter and detect impulse energy associated with the RX Data signals at the RTE input, and generate the RTE main-cursor information; and
  a main-cursor loop comparator configured to compare the RT main-cursor information and the RTE main-cursor information, and generate the main-cursor information;
 the post-cursor detection loop circuitry includes:
  post-cursor RT output circuitry configured to band-pass filter and detect impulse energy associated with the RT_RX Data signals from the RT output, and generate the RT post-cursor information;
  post-cursor RTE input circuitry configured to band-pass filter and detect impulse energy associated with the RX Data signals at the RTE input, and generate the RTE post-cursor information; and
  a post-cursor loop comparator configured to compare the RT post-cursor information and RTE post-cursor information, and generate the post-cursor information.

14. The retiming receiver circuit of claim 8, wherein the SerDes communication link operates continuously in LT mode, with the LTU generating adjusted RT FIR coefficients at a coefficient update rate that is substantially less than a TX data rate used in generating the TX_EQ Data signals.

15. A method of SerDes communications including link training, operable in a SerDes communications link that includes a transmitter and a retiming receiver configured for data communication over a channel, comprising
 transmitting from the transmitter, with a TX FIR circuit, TX_EQ Data signals with TX pre-emphasis EQ, based on adjustable TX_EQ FIR coefficients;
 receiving in the receiver, at a re-timing element (RTE) input, the TX_EQ Data signals from the channel as RX Data signals;
 re-timing the RX Data signals to generate corresponding RT Data with an RT clock;
 generating at an RT output, from the RT Data and RT clock, with an RT FIR circuit, RT_RX Data signals based on adjustable RT FIR coefficients; and
 performing link training by:

providing the adjustable RT FIR coefficients to the RT FIR circuit based on:
  RT_RX impulse cursor information corresponding to the RT_RX Data signals output at the RT output and generated by the RT FIR circuit with RT FIR coefficients; and
  RTE impulse cursor information corresponding to the RX Data signals received at the RTE input, which are transmitted with TX_EQ FIR coefficients;
  such that the RT FIR coefficients used to generate the RT_RX Data signals at the RT output are adjusted to correspond to the TX_EQ FIR coefficients used to transmit the TX_EQ Data signals (with TX pre-emphasis EQ), as reflected in the RX Data signals received at the RTE input;
communicating LT_EQ information based on the RT_RX Data signals output from the RT FIR circuit with the adjusted RT FIR coefficients; and
adjusting, based on the LT_EQ information, the TX_EQ FIR coefficients used to transmit the TX_EQ Data signals, including adjusting TX pre-emphasis EQ.

16. The method of claim 15, further comprising performing equalization on the TX_EQ Data signals received form the channel prior to re-timing the RX Data signals.

17. The method of claim 15, wherein performing link training includes:
determining pre-cursor information corresponding to the RX Data signals at the RTE input;
providing main-cursor information corresponding to a comparison of RTE main-cursor information for the RX Data signals at the RTE input, and RT main-cursor information for the RT_RX Data signals at the RT output;
providing post-cursor information corresponding to a comparison of RTE post-cursor information for the RX Data signals at the RTE input, and RT post-cursor information for the RT_RX Data signals at the RT output; and
generating, from the pre-cursor information, the main-cursor information, and the post-cursor information, through convergence the adjusted RT FIR coefficients used by the RT FIR circuitry to generate RT_RX Data signals.

18. The method of claim 17, wherein determining pre-cursor information is accomplished by:
generating a digital ramp that starts at reset of a pre-cursor unit interval, and increments in one LSB steps until it intersects RX Data corresponding to the RX Data signals at the RTE input within the pre-cursor unit interval; and
sampling the digital ramp, and generating the pre-cursor information.

19. The method of claim 17, wherein:
providing main cursor information is accomplished by:
  low-pass filtering and detecting impulse energy associated with the RT_RX Data signals from the RT output, and generating the RT main-cursor information;
  low-pass filtering and detecting impulse energy associated with the RX Data signals at the RTE input, and generating the RTE main-cursor information; and
  comparing the RT main-cursor information and the RTE main-cursor information, and generating the main-cursor information;
providing the post-cursor information is accomplished by:
  band-pass filtering and detecting impulse energy associated with the RT_RX Data signals from the RT output, and generating the RT post-cursor information;
  band-pass filtering and detecting impulse energy associated with the RT_RX Data signals at the RTE input, and generating the RTE post-cursor information; and
  comparing the RT post-cursor information and RTE post-cursor information, and generating the post-cursor information.

20. The method of claim 15, wherein the SerDes communication link operates with continuous link training, including generating the adjusted RT FIR coefficients at a coefficient update rate that is substantially less than a TX data rate used in generating the TX_EQ Data signals.

* * * * *